United States Patent
Suri et al.

(10) Patent No.: US 11,115,381 B1
(45) Date of Patent: Sep. 7, 2021

(54) HYBRID AND EFFICIENT METHOD TO SYNC NAT SESSIONS

(71) Applicant: VMware, Inc., Palo Alto, CA (US)

(72) Inventors: Saurav Suri, Bangalore (IN); Varun Lakkur Ambaji Rao, Bangalore (IN)

(73) Assignee: VMWARE, INC., Palo Alto, CA (US)

(*) Notice: Subject to any disclaimer, the term of this patent is extended or adjusted under 35 U.S.C. 154(b) by 0 days.

(21) Appl. No.: 17/151,663

(22) Filed: Jan. 19, 2021

(30) Foreign Application Priority Data

Nov. 30, 2020 (IN) .............................. 202041052107

(51) Int. Cl.
G06F 15/16 (2006.01)
G06F 9/54 (2006.01)
H04L 29/06 (2006.01)
H04L 29/12 (2006.01)

(52) U.S. Cl.
CPC ...... H04L 61/2521 (2013.01); H04L 61/1552 (2013.01); H04L 61/2571 (2013.01); H04L 61/6068 (2013.01)

(58) Field of Classification Search
CPC .................................................. H04L 61/2521
USPC ......................................................... 709/245
See application file for complete search history.

(56) References Cited

U.S. PATENT DOCUMENTS

| | | | | |
|---|---|---|---|---|
| 7,042,876 B1 * | 5/2006 | Jayasenan | ......... | H04L 29/12009 370/389 |
| 7,647,427 B1 * | 1/2010 | Devarapalli | ............ | G06F 15/16 709/245 |
| 9,258,271 B1 | 2/2016 | Anderson | | |
| 9,614,761 B1 | 4/2017 | Kamisetty et al. | | |
| 9,832,072 B1 | 11/2017 | Piecuch | | |
| 2003/0081615 A1 | 5/2003 | Kohn et al. | | |
| 2004/0215752 A1 * | 10/2004 | Satapati | ............ | H04L 29/12386 709/223 |
| 2006/0120366 A1 * | 6/2006 | Jayasenan | ......... | H04L 29/12415 370/389 |
| 2008/0225866 A1 * | 9/2008 | Sehgal | .................. | H04L 69/167 370/401 |
| 2008/0240132 A1 * | 10/2008 | Sehgal | ................ | H04L 61/2582 370/401 |
| 2010/0061380 A1 | 3/2010 | Barach et al. | | |
| 2010/0254255 A1 * | 10/2010 | Devarapalli | ............ | H04L 69/40 370/216 |
| 2012/0144043 A1 * | 6/2012 | Huang | .............. | H04L 29/12377 709/226 |

(Continued)

FOREIGN PATENT DOCUMENTS

WO 2011119019 A1 9/2011

OTHER PUBLICATIONS

Non-Published Commonly Owned U.S. Appl. No. 17/072,102, filed Oct. 16, 2020, 41 pages, VMware, Inc.

(Continued)

*Primary Examiner* — Hamza N Algibhah
(74) *Attorney, Agent, or Firm* — Adeli LLP

(57) ABSTRACT

The method of some embodiments synchronizes NAT records between an active gateway and a standby gateway. The active gateway encodes a NAT record that includes at least an external source IP address. The encoded NAT record does not include the external source IP address but does include an identifier that uniquely specifies the external source IP address. The active gateway sends the encoded NAT record to the standby gateway.

20 Claims, 10 Drawing Sheets

NAT Synchronization Record

| Record value types | E.Src.IP 302 | E.Src.port 304 | E.Dest.IP 306 | E.Dest.port 308 | I.Src.IP 310 | I.Src.port 312 | Protocol 314 | Add/delete 402 |
|---|---|---|---|---|---|---|---|---|
| Unencoded size | 4 bytes | 2 bytes | 4 bytes | 2 bytes | 4 bytes | 2 bytes | 1 byte | 1 byte |
| Encoded size | 6 bits | 2 bytes | 1 byte | | 2-3 bytes | 2 bytes | 1 bit | 1 bit |

NAT Synchronization Record examples

| | | | | | | | | |
|---|---|---|---|---|---|---|---|---|
| 410 —— Unencoded 1 | 202.2.3.4 | 1750 | 145.1.1.1 | 852 | 128.1.1.43 | 245 | TCP | Add |
| 412 —— Encoded 1 | bin:000000 | 1750 | 28 | | 1.43 | 245 | bin:0 | bin:0 |
| 414 —— Unencoded 2 | 208.24.1.5 | 432 | 212.3.6.9 | 22 | 128.1.1.27 | 54 | UDP | Delete |
| 416 —— Encoded 2 | bin:000001 | 432 | 0 | | 1.27 | 54 | bin:1 | bin:1 |
| 418 —— Unencoded 3 | 202.2.3.5 | 77 | 157.1.2.3 | 54 | 128.1.3.33 | 636 | UDP | Delete |
| 420 —— Encoded 3 | bin:000010 | 77 | 252 | | 2.33 | 636 | bin:1 | bin:1 |

(56) References Cited

U.S. PATENT DOCUMENTS

| | | |
|---|---|---|
| 2013/0067110 A1 | 3/2013 | Sarawat et al. |
| 2015/0295869 A1* | 10/2015 | Li .......................... H04L 51/12 |
| | | 709/206 |
| 2016/0234112 A1 | 8/2016 | Anand |
| 2017/0359305 A1 | 12/2017 | Yin et al. |
| 2018/0062923 A1 | 3/2018 | Katrekar et al. |
| 2019/0007316 A1 | 1/2019 | Congdon et al. |
| 2019/0097967 A1 | 3/2019 | Xu et al. |
| 2019/0364014 A1* | 11/2019 | Endou ................. H04L 61/2514 |
| 2020/0304413 A1 | 9/2020 | MacCarthaigh |

OTHER PUBLICATIONS

Non-Published Commonly Owned U.S. Appl. No. 17/072,109, filed Oct. 16, 2020, 41 pages, VMware, Inc.

Non-Published Commonly Owned Related U.S. Appl. No. 17/151,665 with similar specification, filed Jan. 19, 2021, 40 pages, VMware, Inc.

Paxton, DR. Napoleon, et al., "Identifying Network Packets Across Translational Boundaries," 10th International Conference on Collaborative Computing: Networking, Applications and Worksharing (CollaborateCom2014), Oct. 22-25, 2014, 8 pages, ICST, Miami, Florida.

\* cited by examiner

NAT Synchronization Record

| Record value types | E.Src.IP 302 | E.Src.port 304 | E.Dest.IP 306 | E.Dest.port 308 | I.Src.IP 310 | I.Src.port 312 | Protocol 314 | Add/delete 402 |
|---|---|---|---|---|---|---|---|---|
| Unencoded size | 4 bytes | 2 bytes | 4 bytes | 2 bytes | 4 bytes | 2 bytes | 1 byte | 1 byte |
| Encoded size | 6 bits | 2 bytes | 1 byte | | 2-3 bytes | 2 bytes | 1 bit | 1 bit |

NAT Synchronization Record examples

| | E.Src.IP | E.Src.port | E.Dest.IP | E.Dest.port | I.Src.IP | I.Src.port | Protocol | Add/delete |
|---|---|---|---|---|---|---|---|---|
| 410 — Unencoded 1 | 202.2.3.4 | 1750 | 145.1.1.1 | 852 | 128.1.1.43 | 245 | TCP | Add |
| 412 — Encoded 1 | bin:000000 | 1750 | 28 | | 1.43 | 245 | bin:0 | bin:0 |
| 414 — Unencoded 2 | 208.24.1.5 | 432 | 212.3.6.9 | 22 | 128.1.1.27 | 54 | UDP | Delete |
| 416 — Encoded 2 | bin:000001 | 432 | 0 | | 1.27 | 54 | bin:1 | bin:1 |
| 418 — Unencoded 3 | 202.2.3.5 | 77 | 157.1.2.3 | 54 | 128.13.33 | 636 | UDP | Delete |
| 420 — Encoded 3 | bin:000010 | 77 | 252 | | 2.33 | 636 | bin:1 | bin:1 |

*Figure 4*

NAT Synchronization Record Decoding/encoding data

External Source IPs

| Identifier | Ext. Src. IP |
|---|---|
| bin:000000 | 202.2.3.4 |
| bin:000001 | 208.24.1.5 |
| bin:000010 | 202.2.3.5 |
| ••• | ••• |
| bin:111111 | 208.24.1.9 |

*Figure 5A*

External Destination IPs/Ports

| Identifier | E.Dest.IP | E.Dest.port |
|---|---|---|
| 0 | 212.3.6.9 | 22 |
| ••• | ••• | ••• |
| 28 | 145.1.1.1 | 852 |
| ••• | ••• | ••• |
| 252 | 157.1.2.3 | 54 |
| ••• | ••• | ••• |
| 255 | ESC | ESC |

*Figure 5B*

Internal subnets

| Identifier | Subnet prefix |
|---|---|
| 1 | 128.1.1 |
| 2 | 128.1.3 |

*Figure 5C*

Protocols

| Identifier | Protocol |
|---|---|
| bin:0 | TCP |
| bin:1 | UDP |

*Figure 5D*

HYBRID AND EFFICIENT METHOD TO SYNC NAT SESSIONS

BACKGROUND

In the field of network computing, the machines and devices in datacenters generally connect to external networks such as the Internet through gateways using IP addresses assigned to the datacenter. However, datacenters tend to have a larger number of devices and machines (physical and virtual) than they have assigned IP addresses. To address this mismatch, datacenters use network address translation (NAT) devices on the gateways of the datacenter. The NAT devices associate the internal source IP and internal source port addresses of connections from devices and machines in the datacenter to the available external source IP and external source port addresses assigned to the datacenter. The NAT devices maintain records of these associations and use the records to determine the appropriate external source IP/port address to apply to data packets sent out by a particular internal source IP/port address and vice versa for incoming data packets.

The NAT devices and gateways are vulnerable to failure (crashing, freezing, etc.). When the NAT device of an active gateway (or the gateway itself) fails without a standby device for backup, all of the existing associations are lost, disrupting any ongoing flows of data between the machines and devices of the datacenter and the external network. Accordingly, datacenters generally include multiple gateways, such as an active gateway and a standby gateway ready to handle any data flows should the active gateway or its NAT device fail. The standby NATs can only supply address translations for records that are synchronized to the records of the active gateway. Prior art active NATs send full copies of all NAT records to the standby NATs. However, this uses up bandwidth within the datacenter that could be used for other data. Accordingly, there is a need in the art for more efficient methods of synchronizing NAT sessions.

BRIEF SUMMARY

The inventions herein implement multiple different methods for increasing the efficiency of NAT record synchronization. These methods fall into three general categories. First, the amount of information can be reduced by sending the NAT records in an encoded form that requires fewer bits and bytes than the full NAT records. Second, the NAT records can be synchronized selectively, with the NAT records of longer-term data flows (sometimes called "elephant flows") synchronized more frequently and NAT records of shorter-term data flows (sometimes called "mouse flows") synchronized less frequently, or in some embodiments not synchronized at all. Third, the NAT records can be synchronized at intervals that adapt to how quickly new NAT records are being generated by the NAT device. Various embodiments may use methods that take advantage of any one, any two, or all three of these categories of methods.

In the category of sending encoded NAT records, the method of some embodiments, synchronizes NAT records between an active gateway and a standby gateway. The active gateway encodes a NAT record that includes at least an external source IP address. The encoded NAT record does not include the external source IP address but does include an identifier that uniquely specifies the external source IP address. The active gateway sends the encoded NAT record to the standby gateway.

In some embodiments, the NAT record includes an internal source IP address. The encoded NAT record does not include the internal source IP address but does include a subnet identifier and a host identifier. The combination of the subnet identifier and the host identifier uniquely specifies the internal source IP address. The internal source IP address may include a subnet prefix and the host identifier, where the subnet identifier is not the subnet prefix, but does uniquely specify the subnet prefix. In some cases, in embodiments that use an IP4 protocol, the subnet prefix includes three leading octets of the internal source IP address and the host identifier includes the ending octet of the internal source IP address. In other cases, the subnet prefix includes two leading octets of the internal source IP address and the host identifier includes two ending octets of the internal source IP address. Some embodiments use other addressing schemes than IP4 protocols. For example, some embodiments use an IP6 protocol. Such embodiments may use a subnet prefix with other numbers of octets, for example, two to five octets with a host identifier of one to four octets.

In some embodiments, the NAT record includes an external destination IP address and external destination port address and the encoded NAT record includes an identifier that does not include the external destination IP address and/or external destination port address, but does uniquely specify a combination of the external destination IP address and external destination port address. The encoded NAT records in embodiments that include such an identifier in a first NAT record may include additional encoded NAT records. In some such embodiments, the identifier that uniquely specifies the combination of the external destination IP address and external destination port address is stored at a particular offset within the first encoded NAT record. However, in a second NAT record, there is a pre-defined identifier at the particular offset, where the pre-defined identifier indicates that a full external destination IP address and full external destination port address of the second NAT record is included in the second encoded NAT record.

The method of some embodiments, before sending the encoded NAT record, stores, at the standby gateway, a set of decoding data that associates each of a set of multiple identifiers that uniquely specify an external source address with the external source address that the identifier specifies. The decoding data may be stored after at least one of (1) receiving decoding data from the active gateway, (2) determining decoding data from a set of configuration data applied to both the active gateway and the standby gateway, and (3) negotiating decoding data between the standby gateway and the active gateway.

In the category of synchronizing NAT records selectively, there are some NAT records that are more important than others. Generally, the loss of a NAT record representing a given long-term data flow results in more damage than the loss of a NAT record representing a given short-term flow. Additionally, waiting longer between synchronizations of short-term flows may result in those short-term flows ending and the NAT record being deleted before it ever needs to be sent to the standby NAT, reducing the number of NAT records to be synchronized.

Accordingly, the method of some embodiments synchronizes NAT records of long-term data flows more frequently than those of short-term flows. More specifically, the method of some embodiments synchronizes network address translation (NAT) records between an active gateway and a standby gateway. Multiple data flows pass between a device at an internal source IP address and a device at an external destination address through the active NAT gateway. For each flow, the method generates a NAT record. The method then determines whether the data flow is a short-term flow or a long-term flow and synchronizes the NAT records of the long-term flows, but not the NAT records of the short-term flows, with the standby gateway.

In some embodiments, determining whether a particular data flow is a short-term flow or a long-term flow includes identifying a data type of the data flow and comparing the data type to a set of identifiers of each of a set of multiple data types as indicating a short-term flow or a long-term flow. The data type may include at least one of a video file, a video call, an HTML file, an audio file, an audio call, and a data file.

In some embodiments, the method determines whether a particular data flow is a short-term flow or a long-term flow by receiving a soft termination of the data flow and inspecting an application layer of at least one packet of the data flow. In some embodiments, determining whether a particular data flow is a short-term flow or a long-term flow includes identifying a packet size of packets of the flow. In some embodiments, the method determines whether a particular data flow is a short-term flow or a long-term flow by identifying an incoming request for data and determining an amount of data requested by the incoming request. The data flow is a TCP flow in some embodiments.

The method of some embodiments may perform multiple synchronizations of NAT records, where performing the multiple synchronizations of NAT records includes synchronizing the NAT records of the long-term flows more frequently and synchronizing the NAT records of the short-term flows less frequently.

In the category of synchronizing the NAT records at intervals that adapt to how quickly new NAT records are being generated by the NAT device, in some embodiments, the method of synchronizing NAT records between an active gateway and a standby gateway synchronizes the NAT records more frequently when the NAT records are being generated quickly relative to prior generation rates and less frequently when NAT records are being generated slowly relative to the prior generation rates.

More specifically, the method of some embodiments for synchronizing NAT records between an active gateway and a standby gateway iteratively performs multiple steps. The method waits a set interval, then synchronizes a set of NAT records generated since an immediately prior synchronization, then adjusts the interval. Adjusting the interval may include comparing a first number of NAT records synchronized in the immediately prior synchronization to a second number of NAT records synchronized in a current synchronization. Adjusting the interval may include increasing the interval when the first number is greater than the second number by a first particular amount and/or decreasing the interval when the first number is less than the second number by a second particular amount. In some cases, the first particular amount is calculated based on at least one of the first and second numbers and the second particular amount is calculated based on at least one of the first and second numbers. In some embodiments, the interval is bounded to remain between an upper bound and a lower bound.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings, and the Claims is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 4 illustrates unencoded and encoded NAT record types and examples.

FIGS. 5A-5D illustrate examples of a NAT synchronization record decoding/encoding data.

DETAILED DESCRIPTION

Figure 1:
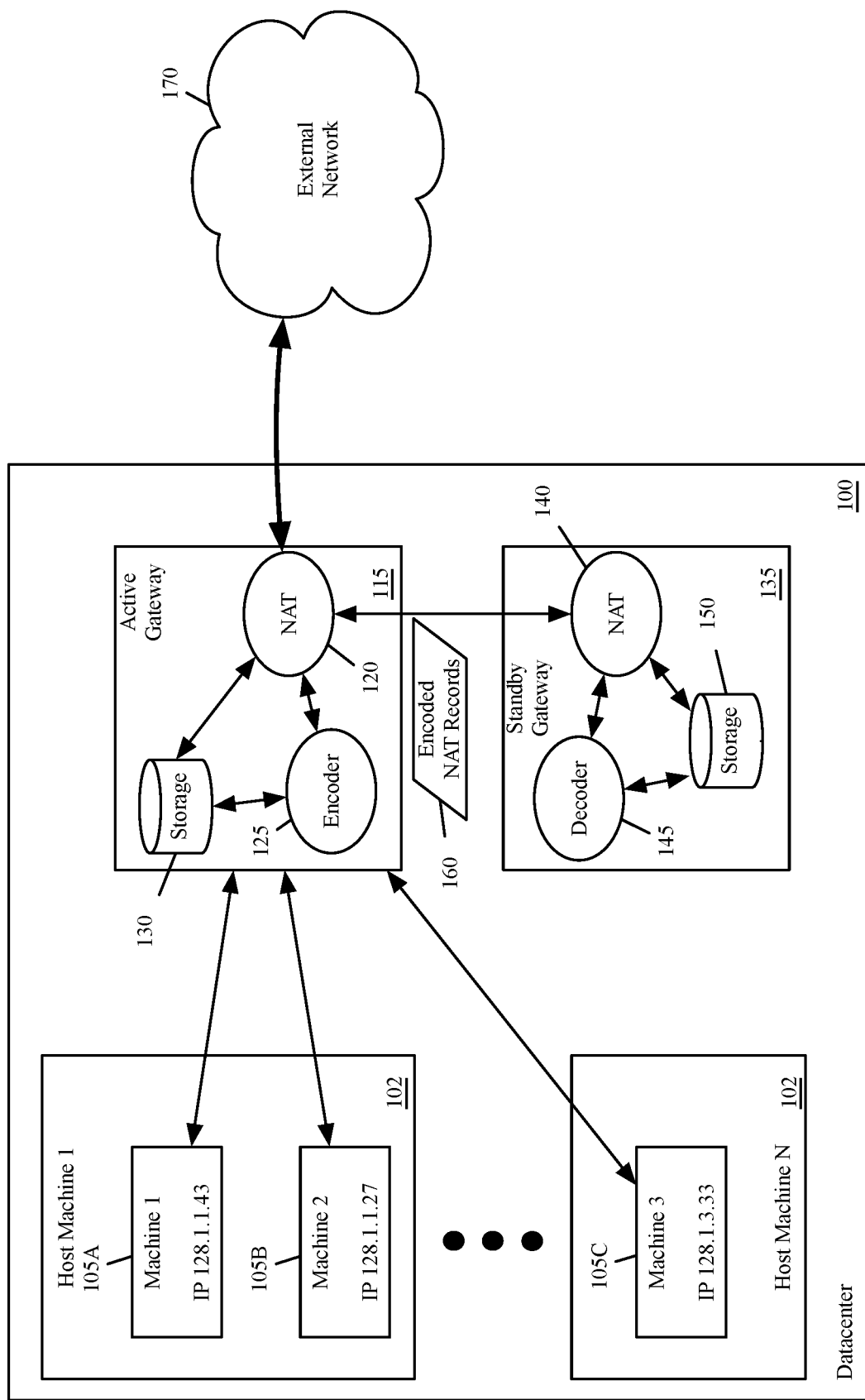
FIG. 1 illustrates a NAT device using a datacenter gateway system with active and standby gateways.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

The inventions herein implement multiple different methods for increasing the efficiency of NAT record synchronization. These methods fall into three general categories. First, the amount of information can be reduced by sending the NAT records in an encoded form that requires fewer bits and bytes than the full NAT records. Second, the NAT records can be synchronized selectively, with the NAT records of longer-term data flows (sometimes called "elephant flows") synchronized more frequently and NAT records of shorter-term data flows (sometimes called "mouse flows") synchronized less frequently or in some embodiments not synchronized at all. Third, the NAT records can be synchronized at intervals that adapt to how quickly new NAT records are being generated by the NAT device. Various embodiments may use methods that take advantage of any one, any two, or all three of these categories of methods.

The inventions described herein are operated in an environment of a datacenter or other individual local network with multiple machines or devices in the local network that connect to an external network through a relatively small (compared to the number of machines or devices of the datacenter) number of external IP addresses. These external IP addresses of the datacenter are called "external source IP addresses" herein in order to distinguish them from the IP addresses on the external network to which the machines and devices of the datacenter are connecting, which are called "external destination addresses" herein.

Due to the relatively small number of external source IP addresses, it is not possible to simply assign each machine or device of the datacenter an external source IP address of its own. However, each machine or device of the datacenter can be assigned an internal source IP address of its own. Each internal source IP address has a large number (e.g., 65,536) of port addresses associated with it as does each external source IP address.

Generally, each machine or device of a datacenter uses at most a relatively small number of the ports of its assigned IP address at any time. Accordingly, it is possible to pair each internal source IP address and port address combination with an external source IP address and port address combination. This pairing uses the many ports of each external source IP address to compensate for the small number of external source IP addresses. This pairing is done by a NAT device that receives outgoing packets from the machines of the network and converts their internal source IP and port addresses to the paired external source IP and port addresses and vice versa for return packets from the machines or devices at the external destination port addresses to the machines or devices on the network.

Connections between machines on networks are generally bidirectional and often involve repeated instances of communication between the same machines. Accordingly, the NAT device will consistently translate each particular pair of internal source addresses to the same corresponding pair of external source addresses. In order to translate consistently, the NAT device keeps records of the translation information for each data flow. A data flow is a set of data packets sent between two machines or devices in which each packet has the same source and destination IP and port addresses and protocol (with the source and destination addresses switched for reply packets) for each packet in the flow.

Using these records to consistently translate the addresses, the NAT device allows the machines and devices in the datacenter to communicate seamlessly with machines and devices of the external network. However, the NAT devices are subject to failures such as crashes, freezes, loss of power to the hardware implementing the NAT device, etc. If the NAT records are lost, the connections between the internal and external machines are broken. The connections can be replaced with new connections, but any data sent using the previous addresses after the NAT device fails will be lost. For some types of applications, establishing a new connection is not an inconvenience. For example, if a user of one machine is simply browsing web pages stored on the other machine, losing the connection may not even be noticed as the next click of a hyperlink establishes a new connection that provides the same information as the previous connection would have. However, if a user is engaged in a video call, the call may be interrupted. If a user is downloading a large file, the download may have to be restarted entirely, wasting the time and bandwidth already spent before the connection was lost.

To avoid the inconvenient loss of connections, datacenters use standby NAT devices to take over in the event that an active NAT device fails. In order to maintain an original connection, the standby NAT device requires the NAT record of that connection. Therefore active NAT devices synchronize their NAT records with the standby NAT devices. As described in the following sections, the methods herein provide a more efficient way of synchronizing some or all of the NAT records of an active NAT device with a standby NAT device. Section A describes methods of sending NAT records in an encoded format that reduces the size of each record, Section B describes methods of synchronizing NAT records selectively, prioritizing long-term data flows such as video calls or file downloads over short-term data flows such as HTML, requests, and Section C describes methods of adaptively synchronizing NAT records, more frequently when many records are being generated and less frequently when few records are being generated.

A. Sending Encoded NAT Records

The methods of some embodiments synchronize NAT records between an active gateway and a standby gateway. The active gateway encodes a NAT record that includes various types of data, such as data identifying (for a particular connection) the external source IP and port addresses, the internal source IP and port addresses, the external destination IP and port address, and the protocol. The methods of this section encode the NAT records of an active NAT device to reduce the amount of data that needs to be sent for each record in order for the standby NAT device to synchronize its NAT records with those of the active NAT device.

Figure 2:
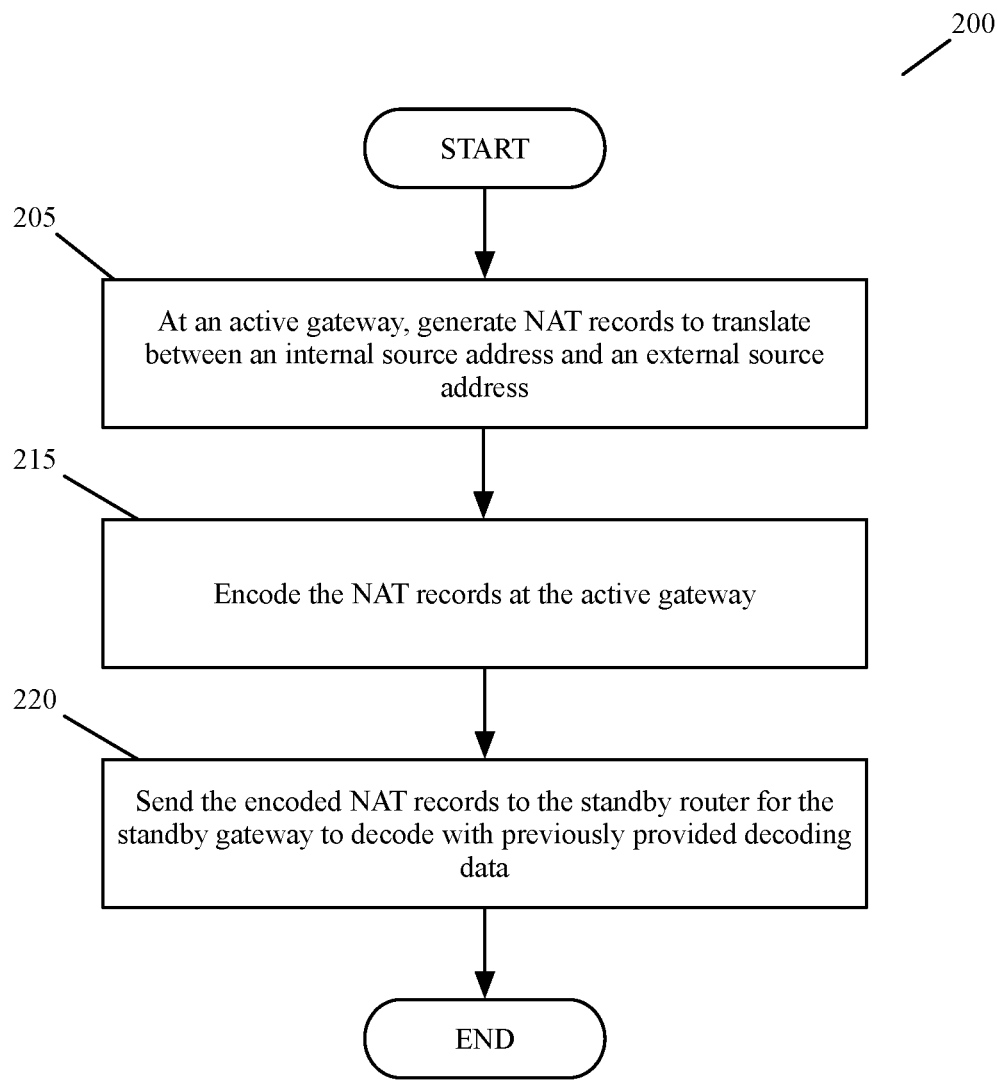
FIG. 2 conceptually illustrates a process of synchronizing stored NAT records of some embodiments.

FIG. 1 illustrates a NAT device using a datacenter gateway system with active and standby gateways. FIG. 1 includes a datacenter 100, with host machines 102A and 102B, executing machines 105A-105B and 105C, respectively, active gateway 115, standby gateway 135, and an external network 170 (e.g., the Internet). FIG. 2 conceptually illustrates a process 200 of synchronizing stored NAT records of some embodiments. FIG. 2 will be described in relation to the relevant elements of FIG. 1.

As shown in FIG. 1, in some embodiments, host machines 102A and 102B in the datacenter may execute one or more machines 105A-105C. These machines may be virtual machines, pods, containers, other virtual devices, and/or other software or hardware that is assigned one or more IP addresses within the datacenter. The machines 105A-105C implement programs (e.g., web browsers, file downloading programs, streaming video programs, etc.) which may require contact with other machines and devices on the external network 170. Each internal machine 105A-105C has an internal IP address within the datacenter 100, and when a machine (e.g., machine 105A) requires a connection to a machine on the external network 170, the machine 105A sends the data out of the datacenter 100 through the active gateway 115.

The active gateway 115 includes a NAT device 120, an encoder 125, and a NAT record storage 130. As shown in FIG. 2 the process 200 begins when the active gateway generates (at 205) NAT records to translate between an internal source address (i.e., the IP address of a machine within the datacenter) and an external source address. In FIG. 1, the NAT device 120 (sometimes called a "NAT" herein) is a software implemented module or device that generates NAT records (not shown) in order to translate the internal network address of the machine 105A to an external addresses used by the external network 170. The external source address is used as a source address, on the external network 170, for packets of a data flow between the machine 105A and a machine on the external network 170. To facilitate this translation, each time the NAT 120 receives a packet of a new data flow (i.e., a data flow with no existing NAT record) between an internal machine of the datacenter 100 and the external network 170, the NAT 120 generates a new NAT record. The types of data stored in a NAT record are further described with respect to FIG. 3, below.

The NAT 120 of the active gateway 115 stores the NAT records in the NAT record storage 130. In some embodiments, the NAT record storage 130 is an independent data recording medium specific to the active gateway 115. In other embodiments, the NAT record storage 130 is a memory space in a larger memory system accessible by the NAT 120.

The process 200 of FIG. 2, encodes (at 215) the NAT records at the active gateway (e.g., gateway 115 of FIG. 1). The stored records are encoded to reduce their size before they are sent to the standby gateway 135. The encoder 125 accesses the NAT record storage 130 to retrieve stored NAT records for conversion into an encoded format. The process 200 of FIG. 2 then sends (at 220) the encoded NAT records to the standby router for the standby router to decode with previously provided decoding data. In FIG. 1, the encoded NAT records 160 are sent by the NAT 120 to a NAT 140 of the standby gateway 135.

Various embodiments generate the decoding data in different ways. In some embodiments, the active NAT (or gateway) provides decoding data to the standby NAT (or gateway). In other embodiments, both the active and standby gateways are provided with configuration data from another machine or device of the datacenter, and the active and standby gateways (e.g., at the NATs of each gateway) each generate encoding/decoding data from the configuration data. In some embodiments, some encoding/decoding data is generated from configuration data while other encoding/decoding data is provided from the active gateway. In some embodiments, some or all of the encoding/decoding data is generated at least partly through negotiation between the active and standby gateways or the active and standby NATs. The decoding data of some embodiments is further described with respect to FIGS. 5A-5D, below.

The standby gateway includes the NAT 140, a decoder 145, and NAT record storage 150. In the configuration illustrated in FIG. 1, the NAT 140 is in a standby mode, receiving encoded NAT records 160 from NAT 120 of the active gateway 115, and in some cases other relevant data such as decoding data. While in standby mode, the standby gateway 135 of some embodiments does not handle outgoing or incoming connections unless and until the active gateway 115 ceases to function (e.g., crashing, freezing, hardware error, connection to the rest of the data network severed etc.). Accordingly, the NAT 140 does not provide any network address translation in standby mode. However, in standby mode, the NAT 140 does operate to receive the encoded NAT records 160 from the active NAT 120. The NAT 140 passes these encoded records 160 to the decoder 145 which decodes the records 160 using the decoding data previously mentioned. Once decoded, the NAT records 160 are stored in the NAT record storage 150.

Although the active gateway 115 is shown as having an encoder 125 while the standby gateway 135 is shown as having a decoder 145, one of ordinary skill in the art will understand that in some embodiments, the active gateway 115 and the standby gateway 135 are provided by equivalent hardware or are provided by programs running on equivalent hardware with the active and standby roles being arbitrarily assigned. In such embodiments, each gateway 115 and 135 includes hardware and/or software for both an encoder 125 and a decoder 145. In some embodiments, the same hardware and/or software may provide both encoding and decoding operations.

Figure 3:
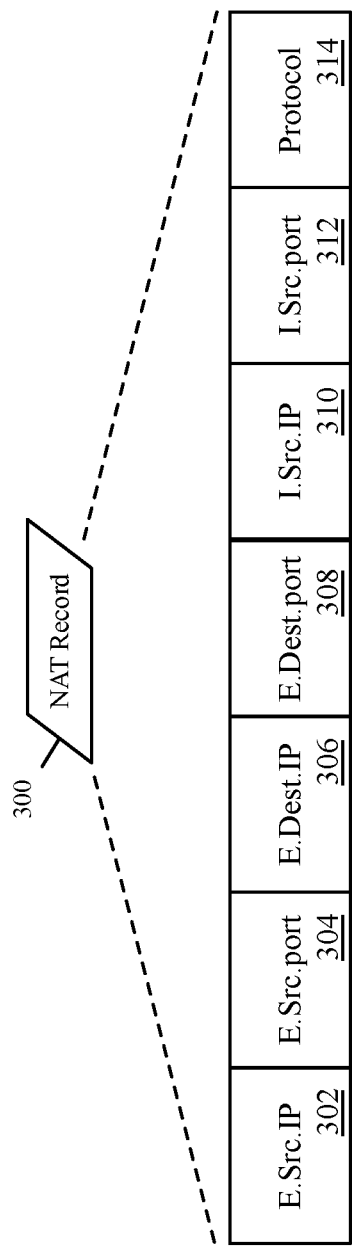
FIG. 3 illustrates the data structure of the NAT records of some embodiments.

FIG. 3 illustrates the data structure of NAT records 300 of some embodiments. As described with respect to FIG. 1, the NAT 120 generates NAT records and stores those NAT records in the NAT record storage 130. NAT record 300 includes an external source IP address 302, an external source port address 304, an external destination IP address 306, an external destination port 308, an internal source IP address 310, an internal source port 312, and a protocol value 314. The combination of the external source IP address 302 and external source port address 304 are used as a source IP and port addresses of packets sent out on the external network from the gateway of the datacenter for a particular data flow associated with the NAT record 300. The external destination IP address 306 and external destination port 308 are the destination IP and port addresses of the packets of the particular data flow. The internal source IP address 310 and internal source port 312 are the IP and port addresses within the datacenter of the machine or device that is the source of the data flow. The protocol value 314 identifies the protocol used by the packets (e.g., TCP, UDP, etc.).

For a particular datacenter, several of the values for multiple records will be redundant and therefore encoding them can reduce the overall data necessary to supply the relevant information to a standby NAT of a standby gateway. FIG. 4 illustrates unencoded and encoded NAT record types and examples. FIG. 4 will be described with occasional references to FIGS. 5A-5D. FIGS. 5A-5D illustrate examples of NAT synchronization record decoding/encoding data.

Although the unencoded external source IP addresses 302 in a NAT record use 4 bytes (32 bits) in the IP4 protocol, each NAT will only have access to a limited number of external source IP addresses (e.g., under 32, under 64, under 100, etc.). In the example of this figure, the NAT is capable of using to up to 64 external source IP addresses. The entire 4 byte IP address is necessary to provide a source address for a packet being sent out on the external network. However, the NAT records will only contain (at most) 64 different external source IP addresses. With only 64 possible external source IP addresses, each can be uniquely identified with a 6 bit number ($2^6$=64 unique identifiers) giving encoding/decoding data for each external source IP address. For example, the unencoded external source IP address of unencoded NAT record 410 (202.2.3.4) which requires 4 bytes to express is represented in the encoded NAT record by a binary number (bin:000000), the unencoded external source IP address of unencoded NAT record 414 (208.24.1.5) is represented in the encoded NAT record by another binary number (bin:000001), etc.

In order to determine which external source IP addresses are identified by each binary number, the NAT uses decoding/encoding data, such as the data shown in external source IP table 500 in FIG. 5A. In table 500, each external source IP address used by the NAT has an associated binary number. Accordingly, if both an encoder of an active NAT and a decoder of a standby NAT have access to the data in table 500, then the encoder of the active NAT can encode any external source IP of the NAT using the associated 6 bit number, saving a total of 26 bits of data in each encoded record compared to each unencoded record. The decoder of the standby NAT can then use the decoding/encoding data to identify the external source IP of the original NAT record when decoding the encoded NAT record.

In FIG. 4, the external destination IP address and port in each unencoded record 410, 414, and 418 take up a total of 6 bytes. The gateways of datacenters are capable of addressing a packet to any IP address and port on the external network. This means that a comprehensive encoding solution that always reduces the size of the IP/port address is not possible for reasons that would be clear to one of ordinary skill in the art. However, during actual operations of a datacenter, there will often be some external destination port/IP addresses that are contacted in more than one flow (e.g., addresses at a popular retail site, a popular video site, etc.). Therefore, the encoding/decoding method of some embodiments maintains data associating the more commonly used IP/port addresses with a unique identifier. In this example, the identifier is a single byte (allowing 256 unique identifiers). FIG. 5B illustrates an external destination IP/port table 510 with various external destination IP address and port address combinations associated with a particular number (e.g., a 1 byte number). In the illustrated embodiment, the table 510 includes an entry associated with the number 255 without a specific IP or port address. This entry represents an escape code of some embodiments that notifies the encoder and decoder that the external destination IP and port combination of the record is not one of the common addresses stored in the encoding/decoding record and that therefore the entire 6 bytes of the combined IP and port address are included in the encoded NAT record. In some embodiments, the additional 6 bytes are appended to the end of an encoded record, while in other embodiments, the additional 6 bytes are placed somewhere within the encoded data record, such as immediately after the escape code. The escape code in some embodiments is designated as some number other than 255.

Many datacenters have IP addresses for the internal machines and devices of the datacenter organized in subnets. Although each machine (e.g., host machine or VM on a host machine) has its own assigned 4 byte IP address, these IP addresses are not assigned arbitrarily. Instead, the machines are each assigned to a subnet with, for example, the first 3 bytes (sometimes called the first three "octets" as each byte is a set of 8 bits) in the IP address being the same for every computer in the subnet and the last octet of the IP address identifying a particular machine or device within the subnet. In FIG. 4, the internal source IP addresses 310 of unencoded NAT records 410 and 414 are on the same subnet as each other, specifically a subnet on which all IP addresses begin with 128.1.1. The internal source IP address 310 of unencoded NAT record 418 is on a different subnet from the other two, a subnet on which all IP addresses begin with 128.1.3, represented in the encoded record 420 by the number 2. The NAT encoding method of some embodiments encodes internal IP addresses by using a unique identifier for the subnet and including the last octet that identifies the machine or device within the subnet. Here, the internal source IP address 128.1.1.43 of unencoded record 410 has been replaced in encoded record 412, by two bytes, one representing the subnet 128.1.1 and one representing the specific machine 43. FIG. 5C illustrates an internal subnet table 520 with subnet 128.1.1 associated with the number 1 for encoding/decoding purposes and subnet 128.1.3 associated with the number 2 for encoding/decoding purposes.

The illustrated examples use an IP4 protocol with the subnets represented by the first three octets of the IP address, with the specific machine within the subnet being represented by the last octet (allowing up to 256 machines/devices per subnet). However, in some embodiments, the subnets are represented by the first two octets of the IP address while the particular machine/device within the subnet is represented by the last two octets (allowing up to 65,536 machines/devices per subnet). In such embodiments, the encoded NAT record provides a one byte identifier for the subnet and a two byte identifier for the particular machine within the subnet. In embodiments that use an IP6 protocol, the subnet prefix may be from two to five octets, with the specific machine within the subnet being represented by from one to four octets. In such embodiments, even though a larger number of octets in the subnet prefix allows for a wider potential range of subnet numbers, as long as the total number of subnets actually in use by the datacenter remains at or below 256, all of the subnets can be identified in the encoded NAT records by one byte of data. One of ordinary skill in the art will understand the minimum number of bits and/or bytes would be necessary to uniquely identify a particular number of subnets in a set of encoded NAT records.

In FIG. 4, the protocol of the data flow (e.g., TCP or UDP) is represented in the unencoded records 410, 414, and 418 by one byte. However, most data sent via IP is either in a TCP or UDP format. In embodiments in which the gateway uses only those two protocols, or only any two specific protocols, the protocol of a data packet can be uniquely identified with a 1 digit binary number (1 bit). The encoded records 412, 416, and 420 each provide one bit to identify the protocol. FIG. 5D illustrates a data table 530 that associates each protocol with a 1 bit number.

As shown in FIG. 4, in addition to the data from the original NAT records, the encoder of some embodiments includes an add/delete value 402. The add/delete value is an extra byte of data appended to the record to indicate whether the encoded NAT record (once sent to the standby NAT and decoded) should be added to the NAT record tracking storage of the standby NAT or whether it represents a record, that is already in that storage, that should be deleted. Add or delete is a binary choice, therefore in the encoded NAT record one bit is used to indicate whether to add or delete the record. In FIG. 4, the command to add the record is represented by a binary number 0 and the command to delete the record is represented by the binary number 1. In some embodiments, the 6 bit identifier of the external source IP address is concatenated with the 1 bit identifier of the protocol and the 1 bit add/delete value to form a single byte in the encoded NAT record.

The above described encoding/decoding methods use specific numbers of bits or bytes for specific data, reducing the number of bytes in an unencoded NAT record from 20 bytes (including the add/delete value) to 8-9 bytes. However, one of ordinary skill in the art will understand that other amounts of encoded data may be used by other embodiments while remaining in the scope of the inventions described herein. For example, in some embodiments, the data table of most common external destination IP address port combinations has up to 65,536 entries (including an escape code in some embodiments), and the encoded IP/port combination is represented by two bytes. In the illustrated embodiments, the external source port addresses 304 and the internal source port addresses 312 are left in their original form rather than being encoded. However, in some embodiments restrictions on the available port values to use enable encoding to reduce the amount of data needed to uniquely identify the port addresses in the encoded NAT records.

B. Synchronizing NAT Records Selectively

As mentioned above, there are some NAT records that are more important than others. Generally, the loss of a NAT record representing a given long-term flow results in more damage, in terms of time and equipment resources to recover the connection, than the loss of a NAT record representing a given short-term flow. For some types of applications, establishing a new connection is not an inconvenience or is only a minor inconvenience. For example, if a user of one machine connected to a second machine through a NAT is simply browsing simple web pages stored on the second machine, losing the connection may not even be noticed as the user's next click of a hyperlink establishes a new connection that provides the same response from the second machine as the previous connection would have. However, if a user is engaged in a video meeting call, the call may be interrupted, requiring time to re-establish and possibly inconveniencing multiple parties in the meeting. If a user is downloading a large file, the download may have to be restarted entirely, wasting the time and bandwidth already spent before the connection was lost.

In addition to it generally being less of an inconvenience to lose a connection of a short-term flow, waiting longer between synchronizations of short-term flows may result in some of those short-term flows ending and their NAT records being deleted before they are synchronized, thus reducing the number of records to be sent when a synchronization of short-term flows does occur. Accordingly, the methods of some embodiments synchronize NAT records of long-term flows more frequently than those of short-term flows. The method of some embodiments synchronize NAT records between an active gateway and a standby gateway. This synchronization method of this invention may be performed in conjunction with the previously described encoding method or may be performed without such an encoding method.

As previously described, in the NAT enabled datacenter of the present invention, multiple data flows pass between a device at an internal source IP address and a device at an external destination address through the active NAT gateway. For each flow, the method generates a NAT record. The method then determines whether the data flow is a short-term flow or a long-term flow and synchronizes the NAT records of the long-term flows, but not the NAT records of the short-term flows, with the standby gateway.

Figure 6:
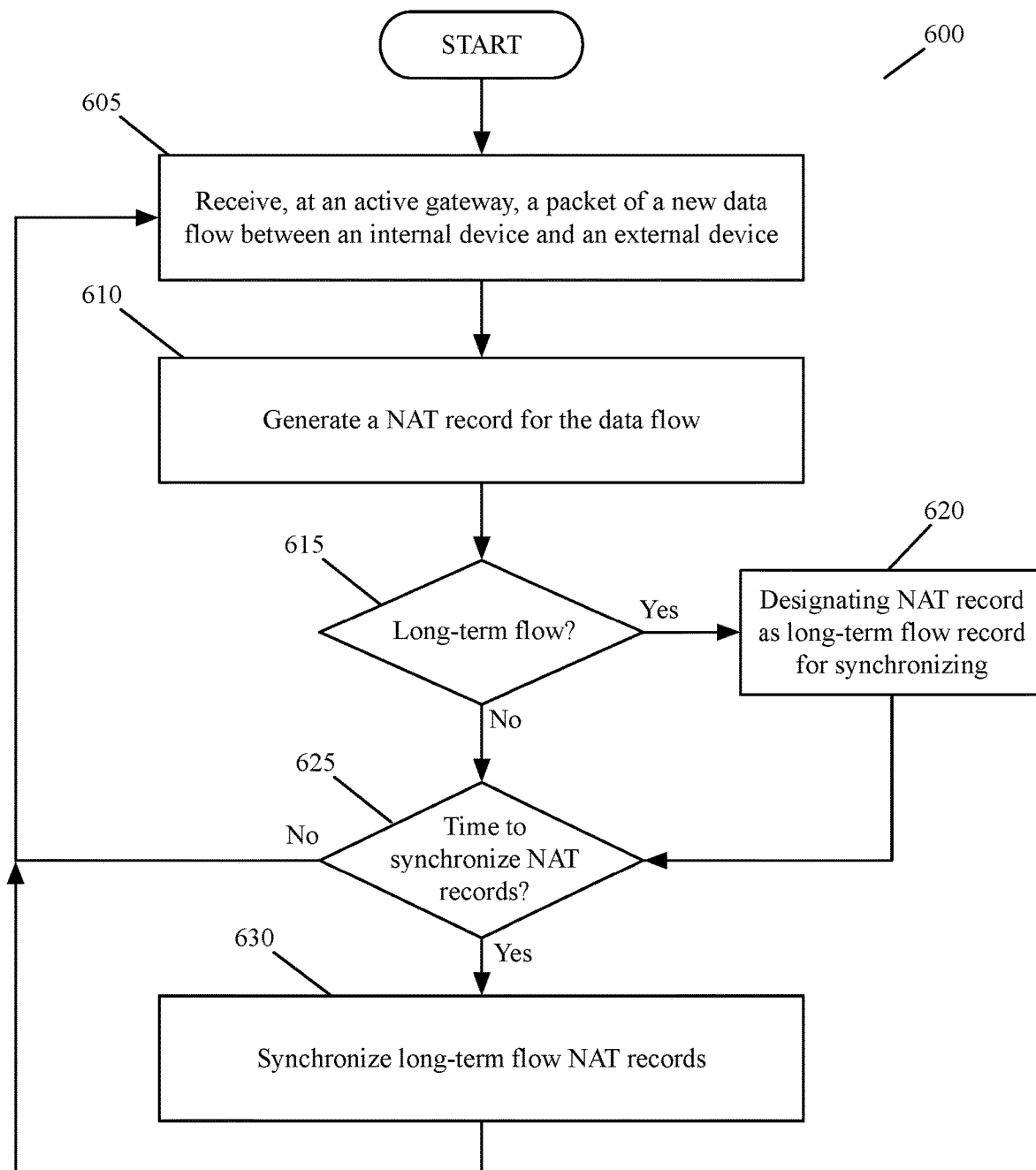
FIG. 6 conceptually illustrates a process of some embodiments for synchronizing NAT records of long-term flows but not short-term flows.

FIG. 6 conceptually illustrates a process 600 of some embodiments for synchronizing NAT records of long-term flows but not short-term flows. The process 600 receives (at 605), at an active gateway, a packet of a new data flow between an internal device (or machine) and an external device (or machine). The process 600 generates (at 610) a NAT record for the data flow. In some embodiments, the NAT record includes the data types shown in FIG. 3. The process 600, of FIG. 6, determines (at 615) whether the data flow is a long-term flow. If the data flow is a long-term flow, the process 600 designates (at 620) the NAT record as a long-term flow for the purposes of synchronizing. In some embodiments, designating the NAT record as a long-term flow record comprises appending an identifier to the NAT record before storing it. In other embodiments, the designation may comprise using a different storage or a different area of the storage than the NAT records for short-term flows. Further details about how the methods of various embodiments determine whether a data flow is a short-term flow or a long-term flow are described with respect to FIGS. 8-10 below.

The process 600 then determines (at 625) whether it is time to synchronize the records. If it is not time to synchronize the records, the process 600 returns to operation 605 to receive a packet of another new data flow. If it is time to synchronize the records, the process 600 synchronizes (at 630) the long-term flow NAT records. Although FIG. 6 shows the determination to perform the record synchronization as being a single operation that occurs a few operations after receiving a new data flow, one of ordinary skill will understand that in some embodiments, the determination of when to synchronize the records depends on a timer which may trigger a synchronization without waiting for a new flow to be received.

Figure 7:
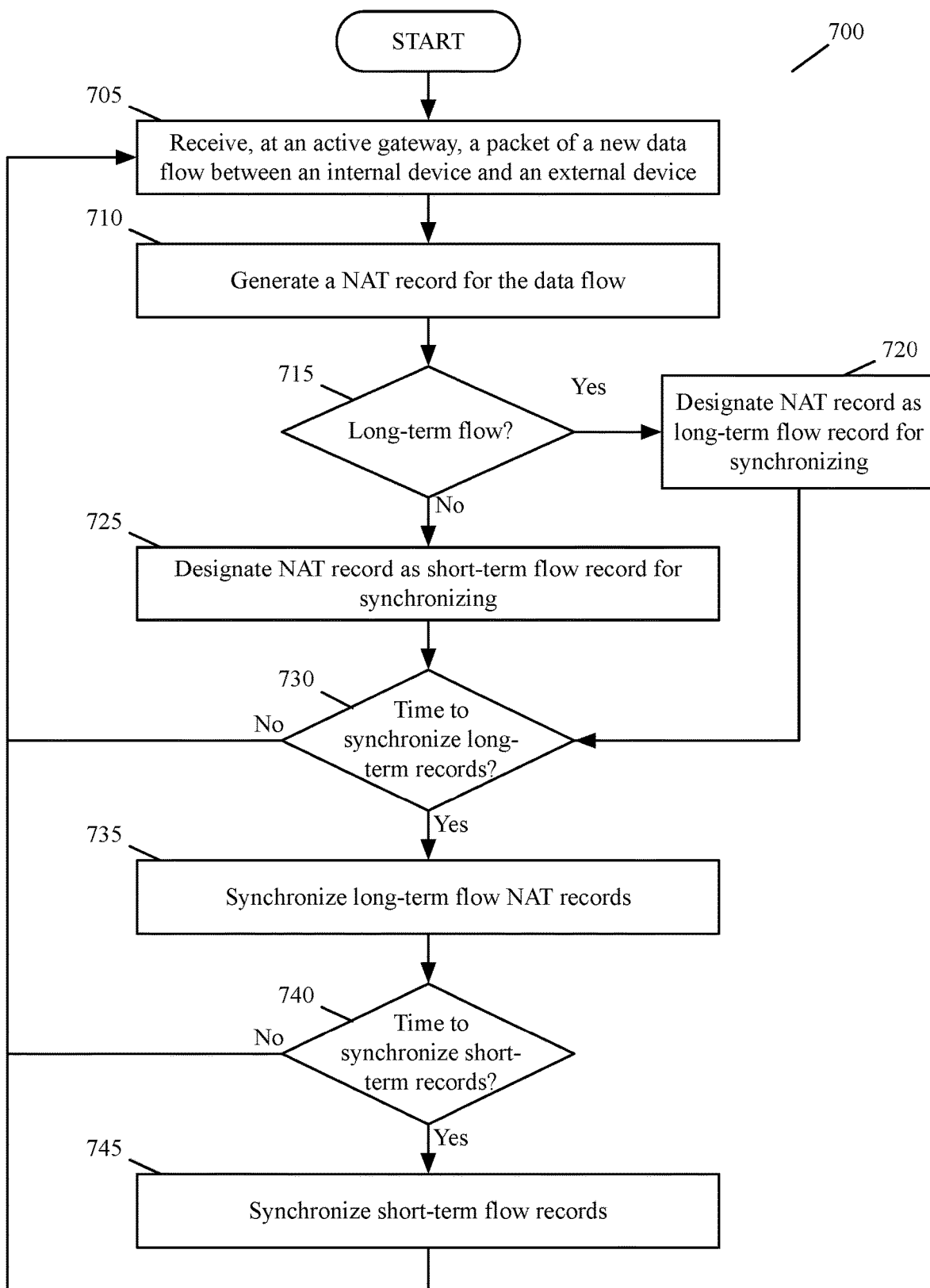
FIG. 7 conceptually illustrates a process for synchronizing long-term flows more frequently than short-term flows.

Although the methods of some embodiments synchronize only the NAT records of long-term flows, the methods of other embodiments may perform synchronizations of NAT records of both long-term and short-term flows. The methods of some embodiments perform the synchronizations of NAT records of the long-term flows more frequently and perform the synchronizations of the NAT records of the short-term flows less frequently. FIG. 7 conceptually illustrates a process 700 for synchronizing NAT records of long-term flows more frequently than those of short-term flows.

The process 700 receives (at 705), at an active gateway, a packet of a new data flow between an internal device (or machine) and an external device (or machine). The process 700 generates (at 710) a NAT record for the data flow. In some embodiments, the NAT record includes the data types shown in FIG. 3. The process 700, of FIG. 7, determines (at 715) whether the data flow is a long-term flow. If the data flow is a long-term flow, the process 700 designates (at 720) the NAT record as a long-term flow for the purposes of synchronizing. If the data flow is a short-term flow, the process 700 designates (at 725) the NAT record as a short-term flow for the purposes of synchronizing.

The process 700 then determines (at 730) whether it is time to synchronize the long-term flow NAT records. If it is not time to synchronize the long-term flow NAT records, the process 700 returns to operation 705 to receive a packet of another new data flow. If it is time to synchronize the long-term flow NAT records, the process 700 synchronizes (at 735) the long-term flow NAT records. The process 700 then determines (at 740) whether it is time synchronize the short-term flow NAT records. If it is not time to synchronize the short-term flow NAT records, the process 700 returns to operation 705 to receive a packet of another new data flow. If it is time to synchronize the short-term flow NAT records, the process 700 synchronizes (at 745) the short-term flow NAT records, and then returns to operation 705.

Although the embodiment of FIG. 7 shows a process 700 in which the determination of whether to synchronize short-term flows (of operation 740) is only made after each synchronization of long-term flows (of operation 735) in other embodiments, the determination of when to synchronize records may be made based on independent timers without any specific relationship between how often short-term flow NAT records and long-term flow NAT records are made.

Figure 9:
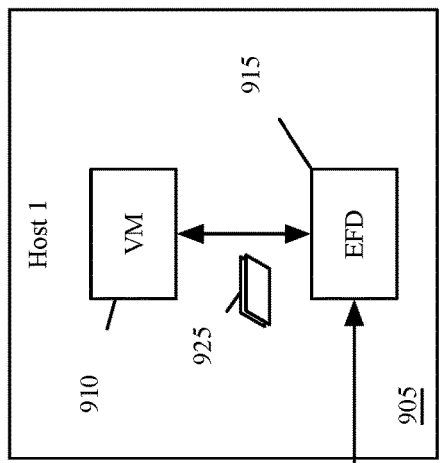
FIG. 9 illustrates a host machine with an elephant flow detector.
Figure 10:
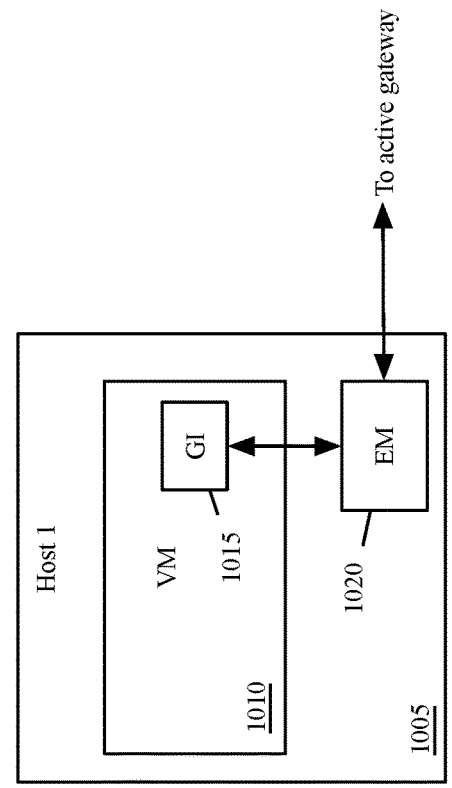
FIG. 10 illustrates a host machine with a VM and an elephant flow module.
Figure 8:
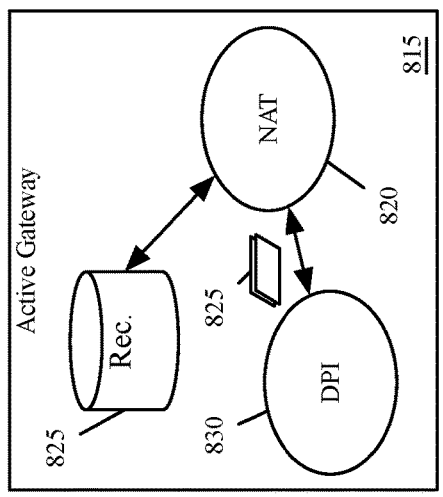
FIG. 8 illustrates an active gateway of some embodiments with a deep packet inspector.

FIGS. 8-10 illustrate various systems for determining whether a particular data flow is a short-term flow or a long-term flow. These methods are used in some embodiments to identify elephant flows in order to synchronize the NAT records of those elephant flows more frequently and synchronize mouse flows less frequently (or not at all in some embodiments). FIG. 8 illustrates an active gateway 815 of some embodiments with a deep packet inspector 830.

The active gateway 815 includes a NAT 820 which provides a set of one or more data packets 825 of a new flow to the deep packet inspector (DPI) 830. In some embodiments, the gateway 815 halts the data flow while the DPI 830 inspects the packets, while in other embodiments, the NAT 820 provides copies of packets in a data flow to the DPI 830, and the DPI 830 inspects the copies while the original packet flow continues.

The DPI 830 determines whether the data flow of the packets is a long-term flow (elephant flow) or a short-term flow (mouse flow). The DPI 830 of some embodiments identifies a flow as an elephant flow or a mouse flow by examining the application layer (L7) parameter of a packet of the data flow. The DPI 830 then compares the L7 parameter with a list of L7 parameters associated with either long-term flows or short-term flows to determine whether that flow is a long-term or short-term flow. For example, if the L7 parameter indicates a file transfer service such as FTP, the DPI 830 may identify the data flow as a long-term flow. In contrast, if the L7 parameter indicates an HTTP request, the DPI 830 may identify the data flow as a short-term flow. More generally, determining whether a particular data flow is a short-term data flow or a long-term data flow may include identifying a data type of the data flow and comparing the data type to a pre-determined set of identifiers of multiple data types as indicating a short-term data flow or a long-term data flow (e.g., from a table or database associating each data type with either long-term or short-term flows). The data type may include at least one of a video file, a video call, an HTML file, an audio file, an audio call, and a data file.

In some embodiments, an agent on a host machine determines whether a data flow is an elephant flow or a mouse flow. FIG. 9 illustrates a host machine 905 with an elephant flow detector 915. The host machine implements a virtual machine 910. The virtual machine 910 sends data packets 925 to the active gateway (not shown). The packets 925 are intercepted on the host 905 by the elephant flow detector 915 which identifies the packet as an elephant flow or mouse flow (e.g., in a similar process to the process performed by the DPI 830 of FIG. 8) and notifies the NAT of the active gateway of the determination (e.g., by sending additional data with a packet, as metadata, or separately that identifies the flow). The NAT of the active gateway then uses this additional data to classify the new data flow as an elephant flow or a mouse flow.

FIG. 10 illustrates a host machine 1005 with a VM 1010 and an elephant flow module 1020. The VM 1010 implements a guest introspection (GI) module 1015 to identify any flows to be sent out of the VM as elephant or mouse flows (e.g., in a process similar to the process performed by the DPI 830 of FIG. 8) before they are sent out. The GI module 1015 of FIG. 10 then passes data identifying the flow and the determination of the flow as a mouse flow or an elephant flow to the elephant flow module 1020 on the host 1005. The elephant flow module 1020 then sends this data to the active gateway (not shown) where the NAT uses the data to determine whether a particular flow is an elephant flow or a mouse flow (e.g., in order to back up NAT records of the elephant flows more frequently and NAT records of mouse flows less frequently or not at all).

Various methodologies and systems for detecting elephant flows and/or mouse flows in some embodiments are described in U.S. patent application Ser. No. 14/231,647, filed Mar. 31, 2014, now issued as U.S. Pat. No. 10,193,771, U.S. patent application Ser. No. 14/231,652, filed Mar. 31, 2014, now issued as U.S. Pat. No. 9,548,924, U.S. patent application Ser. No. 14/231,654, filed Mar. 31, 2014, now issued as U.S. Pat. No. 10,158,538, and U.S. patent application Ser. No. 14/502,102, filed Sep. 30, 2014, now issued as U.S. Pat. No. 9,967,199, all of which are all incorporated herein by reference.

Other embodiments may use other methods of determining whether a data flow is a long-term flow (elephant flow) or a short-term flow (mouse flow). In some embodiments, determining whether a particular data flow is a short-term data flow or a long-term data flow includes identifying a packet size of packets of the flow. In some embodiments, the method determines whether a particular data flow is a short-term data flow or a long-term data flow by identifying an incoming request for data and determining an amount of data requested by the incoming request.

C. Adaptive Synchronizing of NAT Records

Sending data to synchronize NAT records costs not only the time for sending and receiving the actual data, but also overhead in the form of start-up and shut down time for every component involved in the data transfer, regardless of how large or how small the data transfer is. Additionally, new NAT connections are not generated at a constant rate. The same length of time may include a large number of NAT records generated, or just a few. In order to determine efficient times to send synchronization data, the methods of some embodiments synchronize the NAT records according to an adaptive schedule.

Such embodiments synchronize NAT records at intervals that adapt to how quickly new NAT records are being generated by the NAT device. In some embodiments the method of synchronizing NAT records between an active gateway and a standby gateway synchronizes the NAT records more frequently when NAT records are being generated quickly relative to prior generation rates and less frequently when NAT records are being generated slowly relative to the prior generation rates. These embodiments can be used in conjunction with any of the other methods described herein, but can also be used independently of any other methods described herein.

Figure 11:
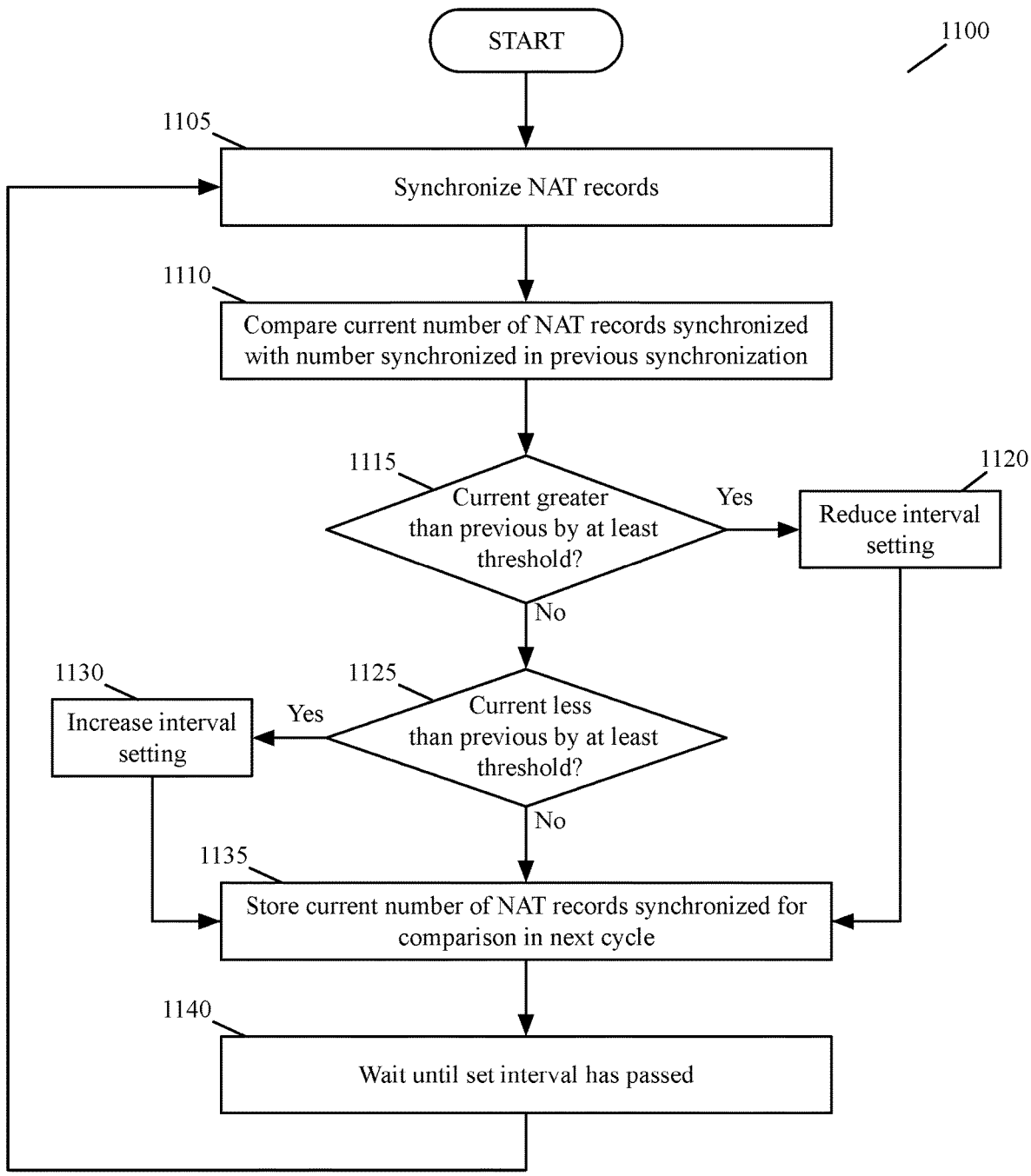
FIG. 11 conceptually illustrates a process of some embodiments for adaptively synchronizing records.

FIG. 11 conceptually illustrates a process 1100 of some embodiments for adaptively synchronizing records. First, the process 1105 synchronizes NAT records (e.g., NAT records generated since the last synchronization, if any). The process 1100 then compares (at 1110) the current number of NAT records synchronized (during operation 1105) with the number of NAT records synchronized in an immediately previous iteration (if any) of the process 1100.

The process 1100 determines (at 1115) whether the current number of NAT records synchronized (during operation 1105) is greater than the number of NAT records synchronized (also during operation 1105) during the immediately previous iteration of the process 1100. For example, the threshold could be 1 NAT record. That is, the condition could be met as long as the current number of NAT records is greater than the previous number of NAT records. In other embodiments, the threshold could be other fixed values (e.g., 2, 5, 10, etc.) or the threshold could be proportional to the previous number or the current number (e.g., the condition could be met if the current number is larger than the previous number by at least 50%).

If the current number is larger by at least the threshold, then the process 1100 reduces (at 1120) an interval setting of an interval to wait before performing the next synchronization operation. For example, the process 1100 may reduce the interval by one second in some embodiments. In some embodiments, the interval setting has a minimum level below which it cannot be reduced. Such embodiments may determine whether the interval is already at this level as a precondition for reducing the interval, or they may reduce the interval, determine that it is below the minimum and increase the interval back to the minimum level.

The process 1100 then stores (at 1135) the current number of NAT records synchronized for reference in operation 1110 in the next iteration of the process 1100. The process 1100 then waits (at 1140) for the set interval to pass before starting the next iteration of the process 1100 by synchronizing (at 1105) again.

If the process 1100 does not determine (at 1115) that the number of NAT records synchronized in the present iteration is greater than in the previous iteration by the threshold amount, then the process 1100 determines (at 1125) whether the current number of NAT records synchronized is less than the previous number by at least a threshold. If the number is less than the previous number by at least the threshold, then the process 1100 increases (at 1130) the interval setting. The interval of some embodiments has a set maximum that is enforced in a similar manner to the set minimum interval discussed with respect to operation 1120. Just as in iterations in which the interval was increased, the process 1100 then stores (at 1135) the current number of NAT records before waiting (at 1140) to start the next iteration of the process 1100. If the process 1100 determines at 1125 that the current number of records synchronized is not less than the previous number by at least the threshold, then the process does not change the interval before proceeding to operation 1135.

In some embodiments, the threshold for the determination of operation 1115 is the same as the threshold for the determination at 1125. In other embodiments, the threshold for the determination of operation 1115 is different from the threshold for the determination at 1125. For example, in some embodiments, the threshold is 1 for the determination at 1115 and the threshold is half of the previous number of synched records for the determination at 1125. In such an embodiment, the interval would decrease whenever the number of records in an interval was greater than in the previous interval, and the interval would increase when the number of records in an interval dropped below half the number in the previous interval.

In some embodiments, rather than adjusting the interval based solely on a comparison between the number of NAT records sent in the current iteration and the previous iteration, the method adjusts the interval based on comparisons with older iterations. For example, in some embodiments, the method tracks the high and low values of the number of NAT records sent in some or all previous iterations to compare against the number of NAT records sent in the current iteration. Some embodiments track statistical data such as the average and/or standard deviation of numbers of NAT records sent in multiple iterations to compare with the number of NAT records sent in the current iteration in order to determine whether and how to adjust the interval. Some embodiments may determine whether to change the interval based on a comparison between the number of NAT records sent in the current iteration and the number of NAT records sent in the iteration in which the interval was last changed.

Although much of the above description focused on NATs that use an IP4 for network addresses, one of ordinary skill in the art will understand that in some embodiments the NATs use other addressing systems. For example, some embodiments use an IP6 network addressing protocol with six octets defining an unencoded network address. In some such embodiments, a datacenter uses subnets defined by any of two, three, four, or five octets with an identifier of specific machines in a subnet using the remaining four, three, two, or one octets, respectively.

The description of the above embodiments included connections between machines (e.g., virtual machines, pods, and/or containers) executing on host machines of a datacenter and machines on an external network. However, one of ordinary skill in the art will understand that the datacenters of some embodiments may include individual hardware machines that are also assigned IP addresses within the datacenter. The NATs of some embodiments also translate the IP addresses of such hardware machines and include such IP addresses in NAT records.

Figure 12:
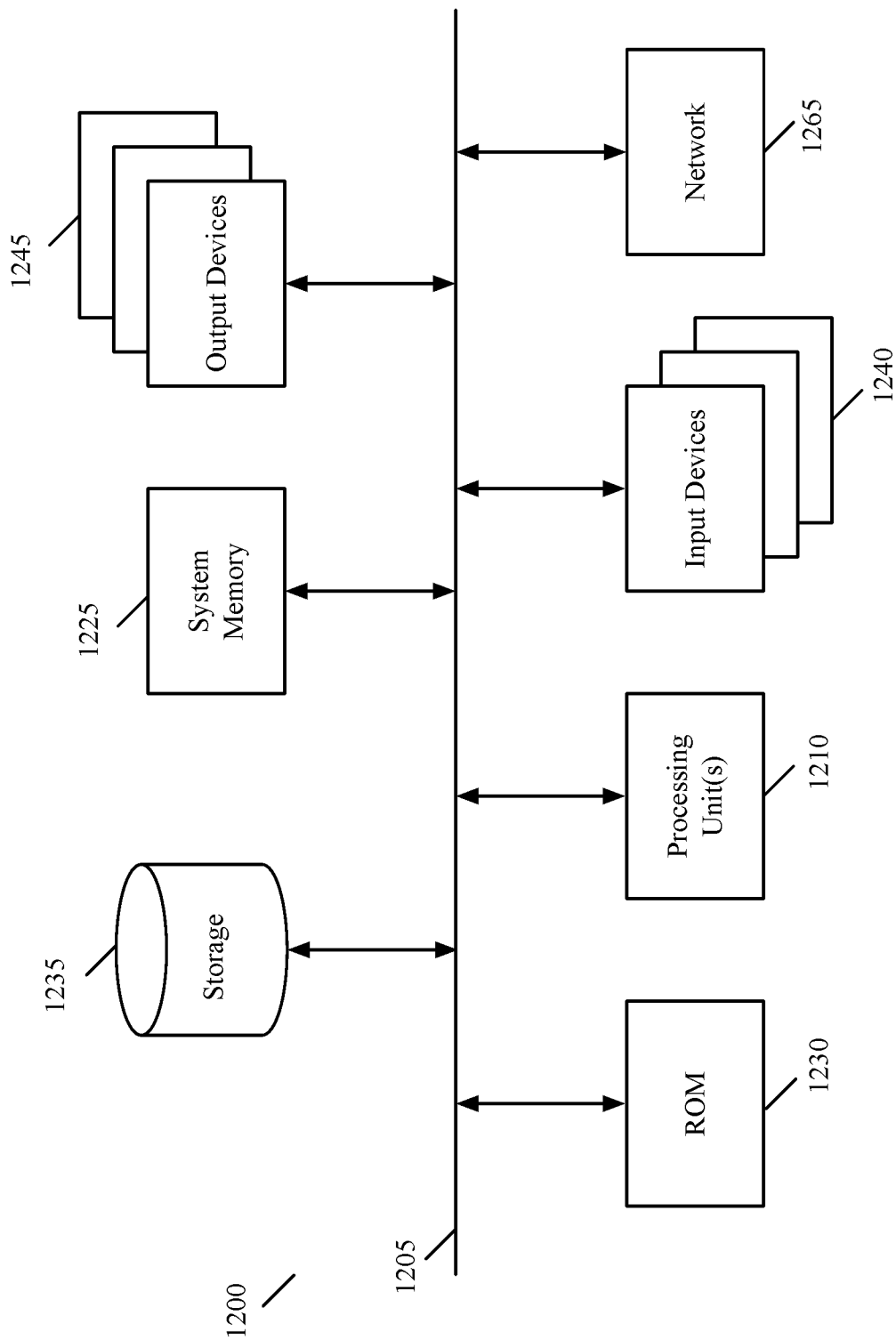
FIG. 12 conceptually illustrates an electronic system with which some embodiments of the invention are implemented.

FIG. 12 conceptually illustrates an electronic system 1200 with which some embodiments of the invention are implemented. The electronic system 1200 can be used to execute any of the control, virtualization, or operating system applications described above. The electronic system 1200 may be a computer (e.g., a desktop computer, personal computer, tablet computer, server computer, mainframe, a blade computer etc.), phone, PDA, or any other sort of electronic device. Such an electronic system includes various types of computer-readable media and interfaces for various other types of computer-readable media. Electronic system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1225, and the permanent storage device 1235.

From these various memory units, the processing unit(s) 1210 retrieve instructions to execute and data to process in order to execute the processes of the invention. The processing unit(s) may be a single processor or a multi-core processor in different embodiments.

The read-only-memory (ROM) 1230 stores static data and instructions that are needed by the processing unit(s) 1210 and other modules of the electronic system 1200. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device 1235. Like the permanent storage device 1235, the system memory 1225 is a read-and-write memory device. However, unlike storage device 1235, the system memory 1225 is a volatile read-and-write memory, such a random access memory. The system memory 1225 stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1245. The input devices 1240 enable the user to communicate information and select commands to the electronic system. The input devices 1240 include alphanumeric keyboards and pointing devices (also called "cursor control devices"). The output devices 1245 display images generated by the electronic system 1200. The output devices 1245 include printers and display devices, such as cathode ray tubes (CRT) or liquid crystal displays (LCD). Some embodiments include devices such as a touchscreen that function as both input and output devices 1240 and 1245.

Finally, as shown in FIG. 12, bus 1205 also couples electronic system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, are non-VM DCNs that include a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method of synchronizing network address translation (NAT) records between an active gateway and a standby gateway, the method comprising, at the active gateway:

encoding a NAT record that comprises at least an external source IP address, wherein the encoded NAT record does not include the external source IP address but does include an identifier that uniquely specifies the external source IP address; and sending the encoded NAT record to the standby gateway.

2. The method of claim 1, wherein the NAT record further comprises an internal source IP address, wherein the encoded NAT record does not include the internal source IP address but does include a subnet identifier and a host identifier, wherein the combination of the subnet identifier and the host identifier uniquely specifies the internal source IP address.

3. The method of claim 2, wherein:

the internal source IP address comprises a subnet prefix and the host identifier and the subnet identifier does not comprise the subnet prefix, but does uniquely specify the subnet prefix.

4. The method of claim 3, wherein the subnet prefix comprises three leading octets of the internal source IP address and the host identifier comprises an ending octet of the internal source IP address.

5. The method of claim 3, wherein the subnet prefix comprises two leading octets of the internal source IP address and the host identifier comprises two ending octets of the internal source IP address.

6. The method of claim 1, wherein the NAT record further comprises an external destination IP address and external destination port address, wherein the encoded NAT record includes an identifier that does not comprise the external destination IP address and/or external destination port address, but does uniquely specify a combination of the external destination IP address and external destination port address.

7. The method of claim 6, wherein the NAT record is a first NAT record, the encoded NAT record is a first encoded NAT record, and the identifier that uniquely specifies the combination of the external destination IP address and external destination port address is stored at a particular offset within the first encoded NAT record, the method further comprising:
at the NAT gateway, encoding a second NAT record, wherein the second encoded NAT record includes a pre-defined identifier at the particular offset, wherein the pre-defined identifier indicates that a full external destination IP address and full external destination port address of the second NAT record is included in the second encoded NAT record.

8. The method of claim 1 further comprising, before sending the encoded NAT record, storing, at the standby gateway, a set of decoding data that associates each of a plurality of identifiers that uniquely specify an external source IP address with the external source IP address that the identifier specifies.

9. The method of claim 8, wherein the decoding data is stored after at least one of receiving decoding data from the active gateway, determining decoding data from a set of configuration data applied to both the active gateway and the standby gateway, and negotiating decoding data between the standby gateway and the active gateway.

10. A machine readable medium storing a program which when executed on at least one processing unit synchronizes network address translation (NAT) records between an active gateway and a standby gateway, the program comprising sets of instructions for, at the active gateway:
encoding a NAT record that comprises at least an external source IP address, wherein the encoded NAT record does not include the external source IP address but does include an identifier that uniquely specifies the external source IP address; and
sending the encoded NAT record to the standby gateway.

11. The machine readable medium of claim 10, wherein the NAT record further comprises an internal source IP address, wherein the encoded NAT record does not include the internal source IP address but does include a subnet identifier and a host identifier, wherein the combination of the subnet identifier and the host identifier uniquely specifies the internal source IP address.

12. The machine readable medium of claim 11, wherein:
the internal source IP address comprises a subnet prefix and the host identifier, and
the subnet identifier does not comprise the subnet prefix, but does uniquely specify the subnet prefix.

13. The machine readable medium of claim 12, wherein the subnet prefix comprises three leading octets of the internal source IP address and the host identifier comprises an ending octet of the internal source IP address.

14. The machine readable medium of claim 12, wherein the subnet prefix comprises two leading octets of the internal source IP address and the host identifier comprises two ending octets of the internal source IP address.

15. The machine readable medium of claim 10, wherein the NAT record further comprises an external destination IP address and external destination port address, wherein the encoded NAT record includes an identifier that does not comprise the external destination IP address and/or external destination port address, but does uniquely specify a combination of the external destination IP address and external destination port address.

16. The machine readable medium of claim 15, wherein the NAT record is a first NAT record, the encoded NAT record is a first encoded NAT record, and the identifier that uniquely specifies the combination of the external destination IP address and external destination port address is stored at a particular offset within the first encoded NAT record, the program further comprising sets of instructions for:
at the NAT gateway, encoding a second NAT record, wherein the second encoded NAT record includes a pre-defined identifier at the particular offset, wherein the pre-defined identifier indicates that a full external destination IP address and full external destination port address of the second NAT record is included in the second encoded NAT record.

17. The machine readable medium of claim 10, wherein the program further comprises sets of instructions for, before sending the encoded NAT record, storing, at the standby gateway, a set of decoding data that associates each of a plurality of identifiers that uniquely specify an external source IP address with the external source IP address that the identifier specifies.

18. The machine readable medium of claim 17, wherein the decoding data is stored after at least one of receiving decoding data from the active gateway, determining decoding data from a set of configuration data applied to both the active gateway and the standby gateway, and negotiating decoding data between the standby gateway and the active gateway.

19. A system comprising at least one processing unit and a machine readable medium storing a program which when executed on the at least one processing unit synchronizes network address translation (NAT) records between an active gateway and a standby gateway, the program comprising sets of instructions for, at the active gateway:
encoding a NAT record that comprises at least an external source IP address, wherein the encoded NAT record does not include the external source IP address but does include an identifier that uniquely specifies the external source IP address; and
sending the encoded NAT record to the standby gateway.

20. The system of claim 19, wherein the NAT record further comprises an internal source IP address, wherein the encoded NAT record does not include the internal source IP address but does include a subnet identifier and a host identifier, wherein the combination of the subnet identifier and the host identifier uniquely specifies the internal source IP address.

* * * * *